United States Patent [19]

Iida

[11] Patent Number: 4,488,685
[45] Date of Patent: Dec. 18, 1984

[54] TAPE WINDING MACHINE
[75] Inventor: Tetuo Iida, Mie, Japan
[73] Assignee: Tokyo Shibaura Denki Kabushiki, Kawasaki, Japan
[21] Appl. No.: 417,634
[22] Filed: Sep. 13, 1982
[30] Foreign Application Priority Data Sep. 14, 1981 [JP] Japan ................... 56-136451

[51] Int. Cl.³ .............. H01F 41/08; B65H 81/02
[52] U.S. Cl. ................... 242/4 BE; 29/605;
57/10; 156/425; 242/4 C; 242/7.23
[58] Field of Search ............ 242/4 R, 4 BE, 4 C,
242/6, 7.08, 7.14, 7.21, 7.22, 7.23, 156, 156.1,
156.2; 29/605, 618; 156/53, 56, 185, 189, 195,
425, 428, 431, 443; 57/10

[56] References Cited

U.S. PATENT DOCUMENTS

| | | | |
|---|---|---|---|
| 1,512,116 | 10/1924 | Lightfoot | 242/7.14 |
| 2,367,086 | 1/1945 | Barry | 242/6 |
| 3,117,742 | 1/1964 | Trombetta | 242/156.2 |
| 3,424,391 | 1/1969 | DiVeto | 242/76 |
| 3,940,073 | 2/1976 | Haeusler et al. | 242/7.23 |
| 4,196,863 | 4/1980 | Sakaue | 242/7.08 |
| 4,249,704 | 2/1981 | Sakaue et al. | 242/7.23 |

FOREIGN PATENT DOCUMENTS 77101 12/1948 Czechoslovakia ........... 242/156.2

Primary Examiner—Billy S. Taylor
Attorney, Agent, or Firm—Oblon, Fisher, Spivak, McClelland & Maier

[57] ABSTRACT

A tape winding machine comprises a bed, a tape winding unit provided on the bed and including a tape reel on which an electric insulating tape is wound and a rotatable taping ring having a notch and carrying the tape reel, and a coil support unit provided on the bed and including a pair of support heads aligned to each other and capable of adjustment of the distance from each other and a pair of clamping mechanisms each carried by each of the support heads for clamping loop portions of a formed coil. The clamp means are each level adjustable and rotatable about a horizontal axis.

16 Claims, 17 Drawing Figures

TAPE WINDING MACHINE

BACKGROUND OF THE INVENTION

This invention relates to tape winding machines and, more particularly, to a tape winding machine for winding a tape on a formed coil used for a rotary electric machine.

Figure 2:
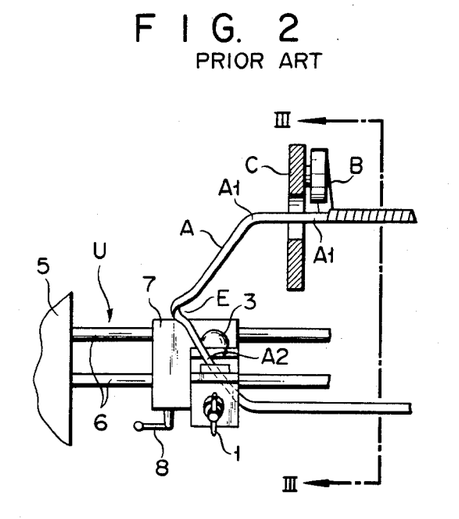
FIG. 2 is a front view showing the left half of a coil support unit of a prior art coil winding machine.
Figure 3:
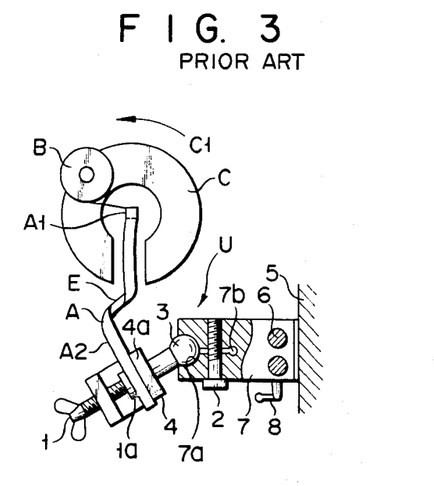
FIG. 3 is a sectional view taken along line III—III in FIG. 2.
Figure 7:
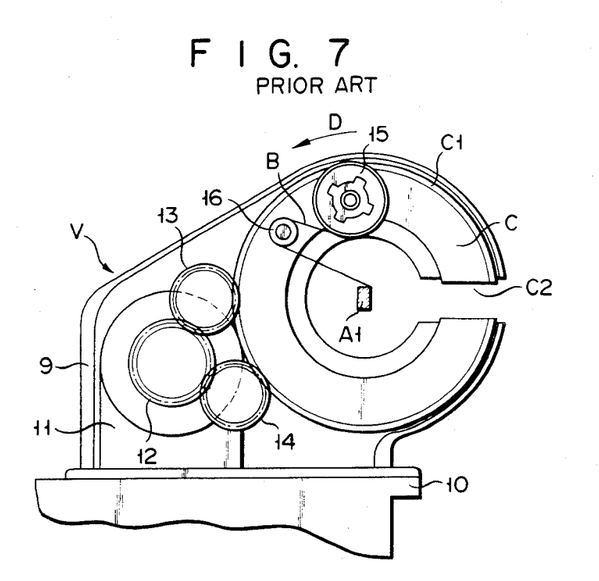
FIG. 7 is an end view showing a main portion of a tape winding unit in a prior art tape winding machine.

A conventional tape winding machine for formed coils (hereinafter referred to merely as "coils"), which comprises a coil support unit as shown in FIGS. 2 and 3 and a tape winding unit is shown in FIG. 7.

Figure 1:
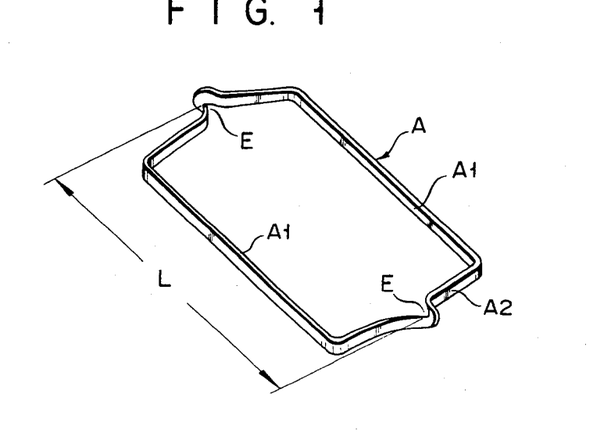
FIG. 1 is a perspective view showing a formed coil.

A coil A on which a tape is to be wound is shown in FIG. 1. It has parallel longitudinal sections A1 and end sections A2 connecting the respective opposite ends of the longitudinal sections A1 with each having a central twisted portion or loop portion E making a desired angle with a plane defined by the longitudinal sections A1. The inner ends of the opposite loop portions E are spaced apart at a distance L as shown in FIG. 1.

FIGS. 2 and 3 are respectively a plan view and a sectional view showing a main portion of the left side part of the coil support unit. The left and right parts of the coil support units are in a mirror image relationship to each other. A pair of parallel horizontal guide bars 6 are supported at the opposite ends in supports 5. The guide bars 6 penetrate and carry a pair of sliders 7. Each slider 7 can be fixed in a desired position to the guide bars 6 by a set screw 8. The slider 7 is formed with a spherical bearing hole 7a and a slit 7b continuous with the spherical bearing hole 7a. A spherical bearing 3 carrying a clamp 4 is received in the spherical bearing hole 7a. A tightening screw 2 is provided in the slider 7 to penetrate the slit 7b at right angles thereto. The orientation of the clamp 4 with respect to the slider 7 can be adjusted by the clamp screw 2. The clamp 4 can hold the corresponding end section A2 of the coil A, other than the loop portion E between a coil support portion 4a and a clamp member 1a, said coil support portions 4a extending at right angles to the shaft of the bearing 3, and said clamp member 1a being formed at the end of a clamp screw 1 screwed to the clamp 4. After the coil A has been held in a desired position by the clamps 4, a taping ring C, which surrounds a longitudinal section A1 of the coil A, is rotated in the direction of arrow C1 in FIG. 3, whereby a rolled tape B carried by the ring C is unwound and wound on the longitudinal section A1 of the coil A.

With this coil support unit U, the clamp 4 can be adjusted in three dimensions. However, it is difficult to fix the clamp 4 at a desired position with perfect accuracy. In addition, the positioning of the clamp 4 takes a long time. Further, the end section A2 of the coil A is not clamped at a fixed position by the clamp 4. Therefore, tape winding errors are likely to occur, reducing the quality of the product coil. Further, the coil A is supported by the clamp 4 at that portion of the end section A2 which is remote from the longitudinal section A1 on which the tape B is being wound. That is, there is a considerable distance from the portion of the coil A clamped by the clamp 4 to the center of the roll of tape B. Therefore, when the tape winding speed is increased, the force exerted on the coil A is increased to such an extent that the coil A can no longer be supported by the clamp 4. In addition, if the sectional area of the coil A is too small, it is possible that the coil A cannot withstand the taping force.

The tape winding head V shown in FIG. 7 has a housing 9 secured to a support 10. In the housing 9, a taping ring C having an external gear C1 and a horizontal notch C2 is rotatably disposed. A driving force from a motor 11 provided in the housing 9 is coupled through an external gear 12 secured to the shaft of a motor in the housing 9 and through intermediate gears 13 and 14 to the taping ring C to rotate the taping ring C in the direction of arrow D. A tape reel 15 on which an electrically insulating tape B is wound is rotatably mounted on one end side of the taping ring C. As the taping ring C is rotated in the direction of arrow D, the tape B is unwound from the tape reel 15 through a guide roller 16 mounted on one end side of the ring C to be wound on a longitudinal section A1 of the coil A extending along the axis of rotation of the ring C. In the taping operation, the coil A is manually fed at a suitable speed in one direction parallel to the axis of rotation of the taping ring C so that tape B is wound on the longitudinal section A1 of the coil A with a suitable lap as shown in FIG. 2.

The tape winding method using this tape winding unit, however, has the following drawbacks.

(1) Since the coil is manually fed, the feed rate of the tape is not constant, and the width of the lap of tape varies.

(2) Insufficient width of the tape lap causes a lower coil dielectric strength, which is apt to lead to defective coils. Therefore, the operator tries to provide a somewhat greater lap of tape than is necessary, so that a greater quantity of tape than the predetermined quantity is used.

(3) The manual feed of the coil requires considerable skill. The width of the tape lap differs from operator to operator.

(4) Since the operator must move a heavy coil which is under a considerable amount of tension from the tape in the taping operation, he will become tired very easily.

SUMMARY OF THE INVENTION

An object of the present invention is to provide a tape winding machine comprising a coil support unit which holds a formed coil at its loop portions which every formed coil has, thus ensuring the accurate positioning of the coil on the coil support unit in a short period of time, thereby reducing tape winding errors and increasing tape winding speed.

Another object of the present invention is to provide a tape winding machine, in which the feeding speeds of the tape winding unit in the longitudinal and/or transversal directions of the tape winding machine and the speed changes are controlled automatically to ensure the width of the lap of a tape wound on the formed coil so that a coil having accurate finished dimensions and uniform insulation properties can be automatically produced.

A further object of the invention is to provide a tape winding machine, which comprises a tape tension control mechanism to control the tension produced in the insulating tape which is being (unwound from) a tape roll carried by a taping ring to a constant value so that a constant force may be exerted on the coil.

According to the invention, there is provided a tape winding machine, which comprises a bed, a tape winding unit provided on the bed and including a tape reel on which an electric insulating tape is wound and a rotatable taping ring having a notch and carrying the tape reel, and a coil support unit also provided on the bed and including a pair of support heads aligned with each other and adjustable in the distance therebetween, a pair of support members supported by said respective support heads and adjustable in level and a pair of clamping means carried by the respective support members and being constructed so as to be rotational about a horizontal axis for clamping respective loop portions of a formed coil.

The tape winding unit includes an automatic control unit, which positions a formed coil such that the portion on which the tape is to be wound is disposed substantially in the center line of the taping ring, holds the taping ring in a direction substantially at right angles to the aforesaid portion of coil, moves the taping ring at a predetermined speed between two points on the coil between which the tape is to be wound, and reverses the direction of movement of the taping ring at the aforesaid two points of coil portion.

The tape winding unit further includes a tensioning means acting on the rolled tape on the tape reel to provide a substantially constant tension to the tape which is being unwound irrespective of the tape roll diameter.

BRIEF DESCRIPTION OF THE DRAWINGS

This invention will be more fully understood from the following detailed description with reference to the accompanying drawings, in which.

DETAILED DESCRIPTION OF THE PREFERRED EMBODIMENTS

The tape winding machine according to the invention is used for winding an electrically insulating tape B on a formed coil A, and it comprises a coil support unit and a tape winding unit. In the following description of the preferred embodiments of the invention, like or equivalent parts in the figures are designated by the same reference numerals and symbols, and their duplicated description is omitted.

Figure 4:
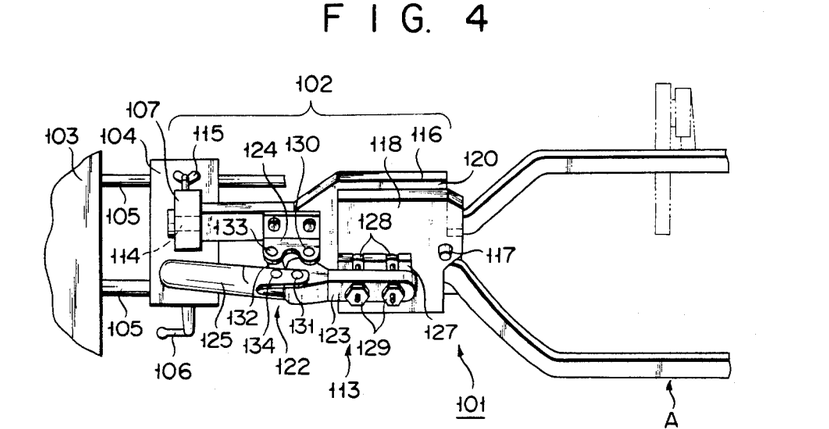
FIG. 4 is a plan view showing a coil support unit in an embodiment of the tape winding machine according to the invention.
Figure 5:
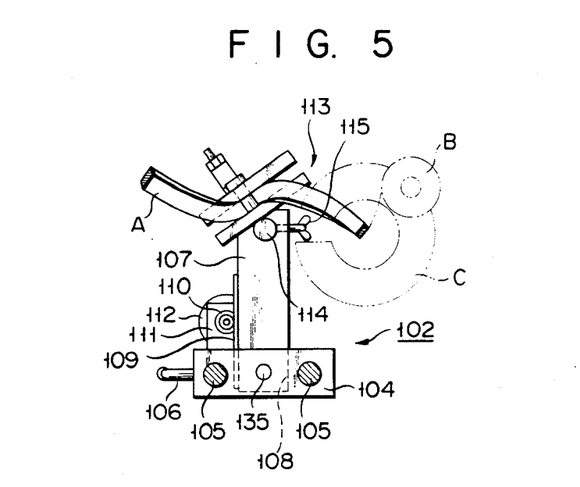
FIG. 5 is an end view showing the coil support unit of FIG. 4.
Figure 6:
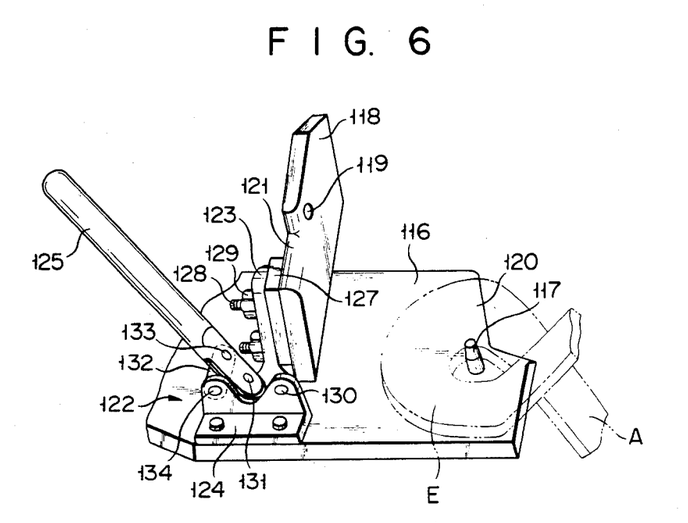
FIG. 6 is a perspective view showing a main portion of the coil support unit shown in FIGS. 4 and 5.

FIGS. 4 to 6 show a coil support unit in one embodiment of the tape winding machine according to the invention.

The coil support unit 101 has a pair of support heads 102 which are in a mirror image relationship to each other, and the left one of which is shown in FIG. 4.

A pair of horizontal guide rods 105 are secured at their ends to a support 103 provided on top of opposed ends of a bed to be described later.

Each support head 102 includes a slider 104, which is penetrated by the guide rods 105 and movable along them. The slider 104 is provided with a clamping screw 106. The slider 104 can be secured in a desired position with respect to the rods 105 by tightening the clamping screw 106.

A vertical support member 107 having a rectangular sectional profile, for instance, is received at its one end in a guide hole 108 which is formed in the slider 104 and has a complementary shape to the support member 107. The support member 107 is fixed by a rack 109 extending in its longitudinal direction and in mesh with a pinion 110 which is rotatably mounted on the slider 104 by a frame 111. The support member 107 can be vertically moved with the rotation of a knob 112 which is coaxially fixed to the pinion 110. The support member 107 can be secured in position relative to the slider 104 by a set screw 135.

The support member 107 supports a clamp mechanism 113 provided at its top portion. The clamp mechanism 113 is constructed as follows.

As shown in FIG. 5, a support shaft 114 is rotatably supported in the top portion of the support member 107 such that it extends parallel to the guide rods 105. The support shaft 114 can be secured in a desired rotational position by a set screw 115 provided on one side of the upper end portion of the support member 107.

A plate-like coil receiving element 116 extends parallel to the support shaft 114 and has a stem portion secured thereto. A pin 117 projects from the inner face of the coil receiving element 116 (hereinafter referred to as the "coil receiver"). A loop portion E of the coil A is to be hooked on the pin 117 for positioning the coil A (FIG. 6). A coil pressing member 118 which has a hole 119 for receiving the pin 117 urges the loop portion E of the coil A against the coil receiver 116. The coil receiver 116 and coil pressing member 118 have respective rounded edges 120 and 121, with which curved portions of the coil A leading from the loop portion E to the opposite side portions of the end section A2 are in contact when the members 116 and 118 are in their closed state. The rounded edges 120 and 121 have a radius equal to or slightly smaller than the radius of the aforementioned curved portions of the coil A so that these curved portions will not be damaged when clamping the loop portion of the coil A.

In this embodiment, the coil pressing member 118 is opened and closed by a toggle mechanism 122. The toggle mechanism 122 includes an arm 123 connected to the coil pressing member 118, a connecting member 124 secured to the coil pressing member 118 and a lever 125. The arm 123 is connected to the coil pressing member 118 such that it extends parallel to the guide rods 105 when the loop portion E of the coil A is clamped between the members 116 and 118. The arm 123 is coupled to the coil pressing member 118 with a spacer 127 interposed therebetween by bolts 128 penetrating the arm 123 and fixed to the outer face of the coil pressing member 118. The arm 123 is secured to the coil pressing member 118 by these bolts 128 and nuts 129 fitted thereon. To make the distance between the members 116 and 118 coincide with the thickness of the loop portion E of the coil A, the thickness of the spacer 127 is set to be equal to that of the portion E. It is convenient to prepare spacers 127 having different thicknesses. The arm 123 is pivoted at its end closer to the support member 107 by a pin 130 to the connecting member 124 secured to a central portion of the coil receiver 116. The coil pressing member 118 thus can be rotated until it is erected normal to the inner face of the coil receiver 116 (FIG. 6).

The lever 125 is pivoted at one end on a pin 131 which is on the outside portion of the arm 123. The lever 125 is coupled by a link 132 to the connecting member 124. One end of the link 132 is connected by a pin 133 to that portion of the connecting member 124, which is closer to the support member 107 than the pin 130. The other end of the link 132 is also connected by a pin 134 to that portion of the lever 125 which is closer to the support member 107 than the pin 131. When the lever 125 is rotated away form the supported member 107, the arm 123 is turned away from the coil receiver 116 via the link 132 and connecting member 124, bringing the coil pressing member 118 to its open position as shown in FIG. 6. When the lever 125 is rotated toward the support member 107, the arm 123 is rotated reversely to bring the coil pressing member 118 to its closed position as shown in FIG. 4.

In operation, the clamp screw 106 on each support head 102 is loosened, and each slider 104 is moved along the guide rods 105 to separate the pins 117 of the individual coil receivers 116 at a distance necessary to receive the loop portions E of the coil A (i.e., substantially equal to the length L of the coil A). The sliders 104 are then secured in the selected positions with respect to the guide rods 105 by tightening the clamp screws 106. After the coil pressing member 118 has been opened by the lever 125 as shown in FIG. 6, the loop portion E of the coil A is hooked on the pin 117 projecting from the coil receiver 116 (FIG. 6). Then, the lever 125 is operated to close the coil pressing member 118. Thus, the loop portion E of the coil A is firmly clamped between the members 116 and 118. The rotational position of the coil A is adjusted by loosening the set screw 115 and rotating the coil a about the support shaft 114. After the set screw 135 is loosened, the level of the coil A can be adjusted by moving the support member 107 vertically via the pinion 110 and rack 109 by the rotating of the knob 112. After these adjustments, the set screws 115 and 135 are tightened again.

With this coil support unit 101, the loop portion E of the coil A are clamped after they have been hooked on the pins 117. That is, the coil A can be clamped at its predetermined portion. Thus, the mounting of the coil A on the tape support unit 101 can be easily done, and the time required for mounting can be reduced. Further, the distance from the line connecting the clamped portions of the coil A to the center line of the taping ring C can be reduced compared to the prior art arrangement. Thus, it is possible to increase the taping force exerted on the coil A and also increase the winding speed of tape B on the coil A.

In the above embodiment the toggle mechanism 122 has been used for the clamp mechanism 113, but it can be replaced with a bolt-nut assembly.

Figure 8:
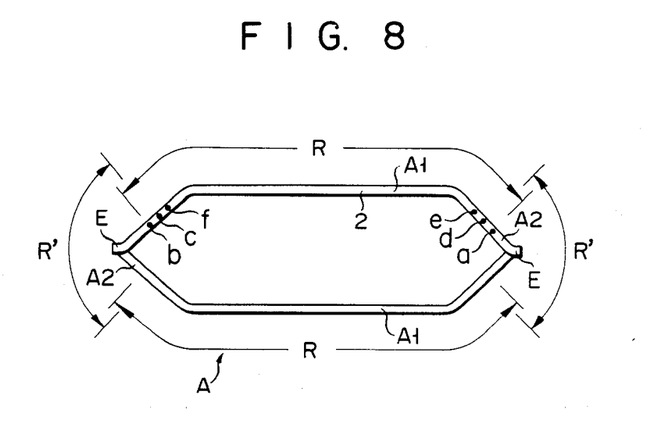
FIG. 8 is a plan view showing tape winding ranges of the formed coil shown in FIG. 1.

Before describing the tape winding unit W in the tape winding machine according to the invention, the method of winding an insulating tape B on the coil A will be described with reference to FIGS. 8 and 9. Referring to FIG. 8, the electrically insulating tape B is wound automatically with the tape winding unit according to the invention over a range R which includes each longitudinal section A1 and most portions of corresponding end sections A2 of the coil A. On the other hand, the tape B is wound manually over a range R' which includes each loop portion E and portions of the opposite side end sections A2 partly overlapping end portions of the ranges R mentioned above.

Figure 9:
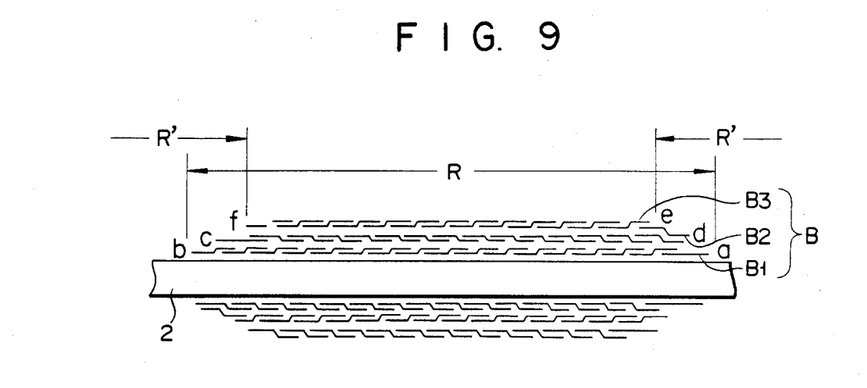
FIG. 9 is a view showing the arrangement of electrically insulating tape layers wound on the formed coil shown in FIG. 8.

Referring to FIG. 9, the end of the tape B is bonded, for instance, with an adhesive tape, to a point a of the coil A, which is the starting point of the range R. Then, the tape B is wound about the coil A while it is fed at a suitable speed toward a point b which is the end point of the range R. Thus, the first tape layer B1 wound with a predetermined lap is formed. When the point b is reached, both the rotation and feed of the rolled tape B are stopped. Then, the tape B is fed in the opposite direction without being wound about the coil A. When the tape B reaches a point c, its rotation is started again. Thus, a second tape layer B2 is formed from the winding start point c as shown in FIG. 9. When the tape B reaches a point d before the point a, the rotation and feed of the tape roll B are stopped again. Then the tape B is moved in the opposite direction without being wound about the coil A. When a point e is reached, the rotation of the rolled tape B is started again. When a point f before the point e is reached, the operation of winding the tape B is ended to complete the formation of a third tape layer B3. Subsequently, the tape B is cut, and the end portion of tape B is bonded by means of an adhesive tape to the coil A.

While the above method is concerned with forming three tape layers, it is of course possible to form any desired number of tape layers by lap winding the tape.

After the winding of tape over the range R of the other side portions of the coil A has been completed, the electric insulating tape B is then wound manually over the portions R'. In this operation, greater laps with respect to the portions R are provided for upper tape layers to make up for portions not wound by upper layer tape to prevent the dielectric strength of the tape layers from being lowered and similar deterioration of the electric characteristics. Sometimes, the thickness of the overlapping portions of the ranges R and R' may be increased by 20 to 40% with respect to the other portions. This, however, does not give rise to any problem in practice for the overlapping portions are deemed to be located outside a coil receiving slot provided in a core of a motor or the like.

One embodiment of a tape winding unit with which the method of winding tape as described above can be carried out will now be described with reference to FIGS. 10, 13, 14 and 15.

Figure 10:
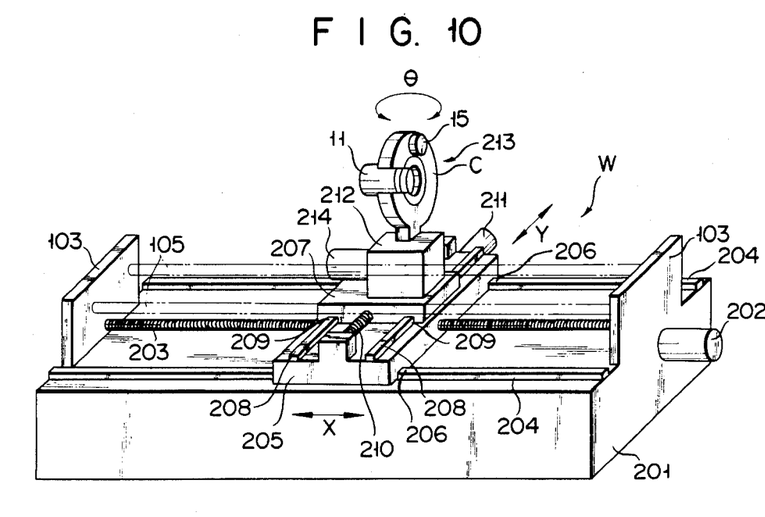
FIG. 10 is a perspective view schematically showing a tape winding unit in the tape winding machine according to the invention.

As shown in FIG. 10, the tape winding unit W has a bed 201. The supports 103 project upright from the top of the opposite ends of the bed 201. A horizontal feed screw 203 which is rotated by a variable speed motor 202 are mounted on the opposite ends of the supports 103. The bed 201 is provided at the top surface with rails 204 extending parallel with the feed screw 203. A longitudinal feeder 205 is mounted on the bed 201 with its grooves 206 formed in the underface slidably fitted on the rails 204. Bearings are disposed between the rails 204 and the grooves 206. The feed screw 203 penetrates the longitudinal feeder 205 crosswise and is in mesh with a nut or female screw provided inside the longitudinal feeder 205. The longitudinal feeder 205 thus can be moved in directions X parallel to the feed screw 203 by the rotation of the motor 202 in the corresponding direction.

A transversal feeder 207 is mounted on the longitudinal feeder 205. The transversal feeder 207 has its underface formed with grooves 209, which slidably fit on rails 208 formed on top surface of the longitudinal feeder 205. The feeder 207 extends at right angles to the rails 204. The longitudinal feeder 205 includes a feed screw 210, which extends over it in parallel with the rails 208 and the rotation of which can be controlled by a variable speed motor 211. The feed screw 210 is mounted on the opposite ends of the longitudinal feeder 205, and it penetrates the transversal feeder 207 and meshes with a nut or female thread provided inside the transversal feeder 207. The transversal feeder 207 thus can be moved in directions Y at right angles to the directions X by the rotation of the motor 211.

A tape winding head 213 is secured onto the transversal feeder 207. A turning section 212 carries the tape winding head 213 which can be rotated in a horizontal plane as shown by $\theta$ about a vertical axis. The tape winding head 213 has the same construction as a conventional tape winder shown in FIG. 7, so it will not be described any further. Its rotational angle $\theta$ is controlled by a motor 214 provided on the turning section 212. The guide rods 105 as shown in FIGS. 4 and 5 are secured at the opposite ends to the supports 103 at the opposite ends of the bed 201. The coil support unit 101 described before is carried by these rods 105, but it is not shown in FIG. 10 for the simplicity of illustration.

Figure 13:
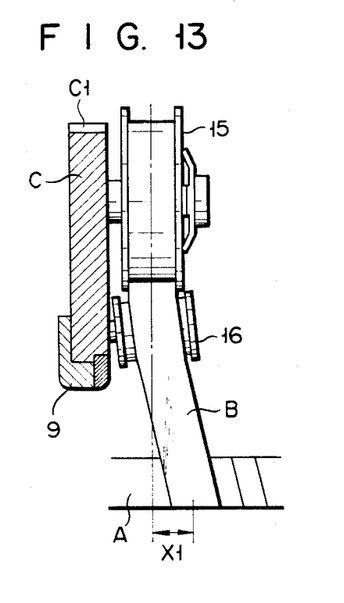
FIGS. 13 and 14 are views showing a tape head in the tape winding unit of FIG. 10 when the winding of tape on a formed coil is moving to the left and to the right, respectively.
Figure 14:
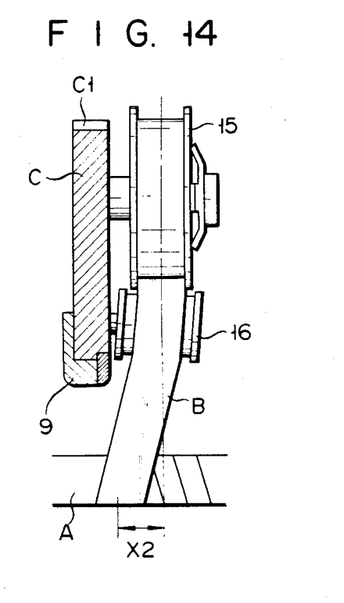

FIGS. 13 and 14 respectively illustrate a main portion of the tape winding head 213 in a state where the rolled tape A is being fed toward the left and in a state where the tape roll is being fed toward the right. The parts of the tape winding head 213 are the same as those in the tape winding head V shown in FIG. 7, so their detailed description will not be given. As shown in FIGS. 13 and 14, the center of the tape on the tape reel 15, in the width direction thereof, is deviated from the center of the tape being wound by x1 and x2 in the direction of progress of rolled tape B, respectively.

Figure 15:
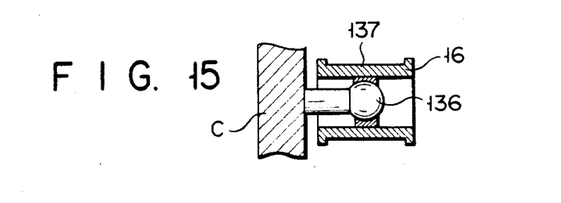
FIG. 15 is a sectional view of means for coupling a tape reel to a taping ring in the tape head shown in FIG. 10.

FIG. 15 shows an example of the guide roller 16 mentioned above. It includes a spherical bearing 136 projecting from the side wall of the taping ring C and a spherical retainer 137 secured within the guide roller 16 for receiving the spherical bearing 136. The guide roller 16 thus assumes any three-dimensional orientation with respect to the taping ring C.

The operation of the tape winding unit W shown in FIG. 10 will now be described with reference to FIG. 11. Before starting the winding of tape B, the adjustment of the level of the support members 107 in the tape support unit 101, adjustment of the positions of the longitudinal feeder 205 in the directions X, adjustment of the position of the transversal feeder 207 in the directions Y, and adjustment of the angle $\theta$ of the tape winding head 213 in the directions by the motor 214 are made. The coil A is then positioned such that the portion on which the tape B is to be wound extends on the center line of the taping ring C.

The rolled tape B is moved from a point XVI which is deviated by x2 minus half the width of the tape B from the starting point a of the range R toward the corresponding loop portion E to a point VIII which is deviated by x1 plus half the width of the tape B from the end point b of the range R toward the corresponding loop portion E. For forming the first tape layer, the rolled tape B is moved from the point I to the point VIII, accompanying the winding of the tape B on the coil A. In this case, the points a and b coincide with the outer edge of the first and last turns of tape B for the first tape layer, respectively.

The point I is separated by x1 plus half the width of the tape B from the point a toward the corresponding longitudinal section A1 of the coil A.

First, the leading end of the tape B is secured by adhesive means, such as adhesive tape, to the point a of the right hand end section A2 of the coil A from which the tape B is to be wound. Before starting the winding of the tape, the tape winding head 213 is rotated horizontally in the clockwise direction in FIG. 10 from the line parallel with the longitudinal sections A1 of the coil A and is passed through the center of the taping ring C by an angle $\alpha$ defined between the longitudinal section A1 and associated right end section A2 of the coil A so that the taping ring C is disposed at right angles to the right end section A2 of the coil A. The angle $\theta$ of rotation of the tape winding head 213 is calculated with respect to the aforementioned line as reference line. The angle of rotation in the clockwise direction is defined to be positive, and in the counterclockwise direction to be negative. In the instant case, $\theta = +\alpha$.

The selection of the speed and direction of feed of the longitudinal and transversal feeders 205 and 207, the stopping and changing of the feed direction thereof, the speed of the taping ring C, the time of start and stop of rotation thereof, and the turning of the tape winding head are all automatically controlled by suitable control means such as a microcomputer. The combination of the longitudinal feeder 205, motor 202, feed screw 203 and rails 204 is referred to as an X-axis feed mechanism 215, and the combination of the transversal feeder 207, motor 211, feed screw 210 and rails 208 is referred to as a Y-axis feed mechanism 216.

First, the longitudinal and transversal feeders 205 and 207 are driven to bring the rolled tape B to the point I while the taping ring C is stopped. The taping ring C is then rotated, so that the tape B is wound on the coil A at a predetermined speed. Simultaneously, the feeders 205 and 207 are driven to move the taping ring C along the end portion A2 of the coil A.

The tape winding head 213 is moved at a predetermined speed from the point I to a point II. The rotation of the taping ring C is continued during the course of feeding the tape winding head 213 from the point I to a point VIII. When the head 213 reaches the point II, the rotational angle of the head 213 is changed from $\theta = +\alpha$ to $\theta = 0$ by the motor 214 and also the directions of feed of the longitudinal and transversal feeders 205 and 207 are changed so that the head 213 is moved from the point II to a point III. The rotation of the head 213 is started at the point II and ended at the point III.

When the head 213 reaches the point III, the transversal feeder 207 is stopped, and only the longitudinal feeder 205 is continuously driven at a predetermined speed to move the head 213 toward a point IV while the tape is wound on the coil A.

When the head 213 reaches the point IV, the rotational speed of the taping ring C and the feed speed of the longitudinal feeder 205 are increased to, for instance, three times those at the time of the feed over the range between the points III and IV. At the increased speed, the head 213 is moved to a point V. The range between the points IV and V corresponds to a straight portion of the longitudinal section A1 of the coil A. Thus, during this course of feed, the tape B can be wound at the increased speeds mentioned above without the possibility of tape breakage or of error generation in the pitch of tape turns. Thus, the efficiency of tape winding can be increased.

When the tape winding head 213 reaches the point V, the rotational speed of the taping ring C and the feed speed of the longitudinal feeder 205 are changed again to those during the feed between the points III and IV. When the head 213 reaches the point VI, the speed of the longitudinal feeder 205 is reduced, and at the same time the transversal feeder 207 is started again. Further, the head 213 is rotated from its rotational angle $\theta=0$ to $\theta=-\alpha$ during its feed from the point VI to a point VII. When the head 213 reaches the point VII, the speeds of the longitudinal and transversal feeders 205 and 207 are changed to those during its feed between the points I and II, although the rotational direction of the feeder 205 is reversed. When the head 213 reaches the point VIII, the rotation of the taping ring C is stopped, and the longitudinal and transversal feeders 205 and 207 are also stopped. In this way, a first tape layer is formed on one side of the coil A. In this state, the tape winding head 213 is held in its rotational position $\theta=-\alpha$ by the turning section 212, and the state of winding of tape B is as shown in FIG. 13.

Then, the second tape layer is formed in the following way. The tape winding head 213 is moved from the point VIII to a point IX by the longitudinal and transversal feeders 205 and 207 without rotation of the taping ring C. When the head 213 reaches the point IX, the taping ring C starts to rotate, while at the same time the longitudinal and transversal feeders 205 and 207 are fed at predetermined speeds. At this time, the longitudinal feeder 205 is driven at the same speed as, and in the opposite direction to, those in the feed between the points I and II, while the transversal feeder 207 is moved at the same speed, and in the same direction, as those in the movement between the points I and II. In this state, the tape B is as shown in FIG. 14. The distance between the points VIII and IX is set equal to x1 +x2. Subsequent operations between points X and XI, between points XI and XII, between points XII and XIII (the points being disposed at the same position as the points V and IV), between points XIII and XIV, between points XIV and XV and between points XV and XVI are, respectively, the same as the operations between the points II and III, between the points III and VI, between the points VI and V, between the points V and VI, between the points VI and VII and between the points VII and VIII except that the direction of feed is opposite. With the feed of the tape winding head 213 from the point VIII through the points IX, X, XI, XII, XIII, XIV and XV to the point XVI the second tape layer is formed. When this is completed, the rotation of the tape winding head 213 and the feed of the longitudinal and transversal feeders 205 and 207 are stopped.

Then, the third tape layer is formed. More particularly, the tape winding head 213 is fed by the longitudinal and transversal feeders 205 and 207 without rotation of the taping ring C from the point XIV, and when it reaches a point I3 the rotation of the taping ring C is started to form the third tape layer. The winding of tape B for the first tape layer is started from the point I, while the winding of tape for the third layer is started from the point I3. That is, outer tape layers have their ends receded with respect to the preceding lower tape layers as shown in FIG. 9.

As has been shown, the tape B can be wound automatically for most of the coil. Thus, the tape layers can be lapped much more precisely compared to the prior art. That is, it is possible to produce a coil having accurate finished dimensions and uniform insulating proper. Further, the quantity of tape used can be reduced compared to the prior art tape winding operation. Further, since the length of portions of the coils over which the tape is manually wound is much shorter the worker fatigue is greatly reduced.

Figure 11:
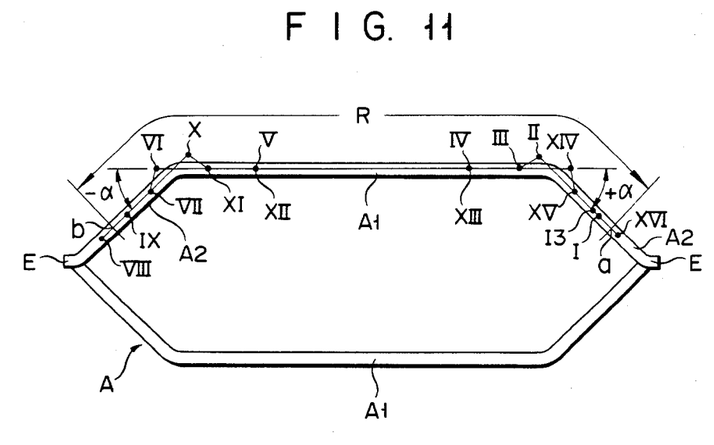
FIGS. 11 and 12 show steps of winding tape on the formed coil in FIG. 8.
Figure 12:
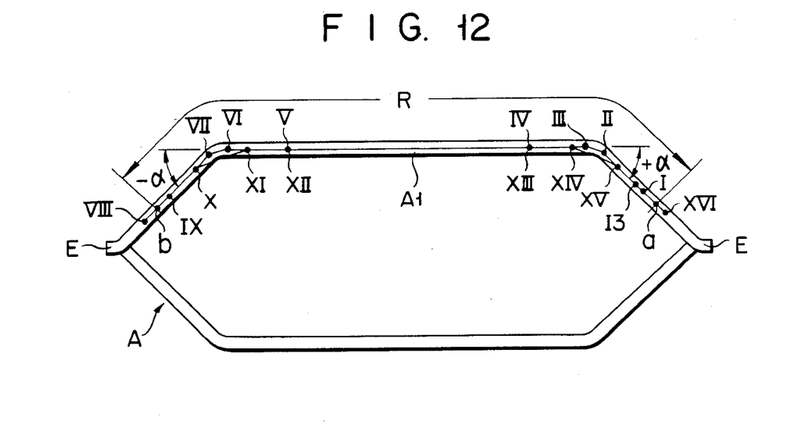

FIG. 12 shows a modification of the locus of the tape winding head 213 for the tape winding operation shown in FIG. 11 so that it is used for coils having specific dimensions and configurations.

Figure 16:
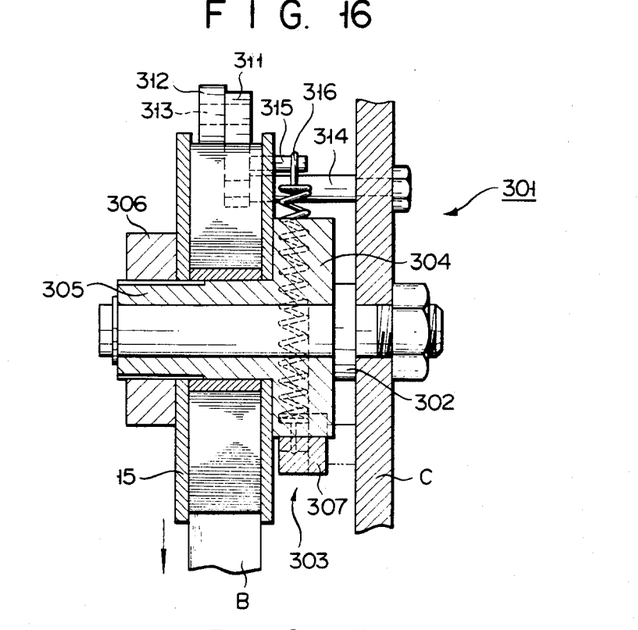
FIG. 16 is a sectional view showing a tape tension control mechanism used in the tape head shown in FIG. 10.
Figure 17:
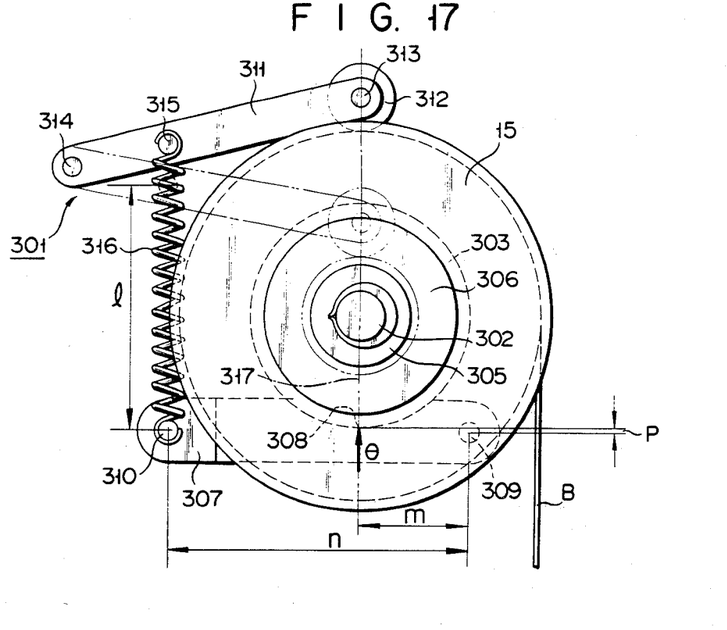
FIG. 17 is an end view showing the tape tension control mechanism shown in FIG. 16.

FIGS. 16 and 17 show a tape tension control mechanism 301 which cooperates with the tape reel 15 of the tape winding head 213.

The tape reel 15 is rotatably mounted by a brake drum 303 on a shaft 302 which is coupled to the taping ring C. The brake drum 303 includes a drum body 304, a hollow cylindrical support portion 305 integral with the drum body 304 and carrying the tape reel 15 coaxially secured thereto, and a nut 306 screwed onto the support portion 305 to clamp the tape reel 15 between it and drum portion 304.

A bar-shaped brake shoe 307, which has a brake face 308 of a complementary shape to part of the outer periphery of the drum body 304, is pivoted at one end on a pin 309 to the taping ring C and has a pin 310 projecting from the other end in parallel to the pin 309.

A follower lever 311 carries at one end a shaft 313 on which a roller 312 is rotatably mounted so as to contact the tape B wound on the tape reel 15. The lever 311 is pivotally supported at the other end by a pin 314 projecting from the taping ring C. The roller 312 normally contacts the rolled tape B on the tape reel 15 at a portion diametrically opposite to the center of the brake face 308 with respect to the tape reel 15. The follower lever 311 has a pin 315 intermediate the shaft 313 and pin 314. An extension coil spring 316 has its respective ends anchored to the pins 310 and 315 such that it extends substantially parallel to a line 317 connecting the center of the brake face 308 and the center of the shaft 313. The spring 316 urges the brake face 308 of the brake shoe 307 against the outer periphery of the drum body 304 of the brake drum 303, thus applying tension to the tape B which is being unwound from the tape reel 15. The roller 312 is urged by the spring 316 through the follower lever 311 so that it is pressed against the tape B on the tape reel 15 at a position opposite the center of the brake face 308, thus ensuring uniform tension in the tape B which is being unwound.

Let it be assumed that:

Q : the force (in kg) with which the brake shoe 307 is urged against the drum body 304 of the brake drum 303;

$\mu$ : coefficient of friction between the brake shoe 307 and drum body 304;

R : the radius (in cm) of the drum body 304;

r : the radius (in cm) of the outer periphery of the rolled tape B;

F : the spring force (in kg) of the extenson coil spring 316;

P : the tension (in kg) exerted on the tape B;

m the distance (in cm) in the longitudinal direction of the brake shoe 307 between the axis of the pin 309 and the center of the brake face 308;

n : the distance (in cm) between the axes of pins 309 and 310; and p : the distance (in cm) along the line 317 between the axis of the pin 309 and the brake face 308.

Then, $$P = \frac{\mu \cdot n \cdot R \cdot F}{r(m + \mu \cdot p)} \quad (1)$$

Hence, $$P = K \cdot \frac{F}{r} \quad (2)$$

where K is a constant.

The spring force F is proportional to the elongation l of the spring 316 from the free length thereof, and the elongation l is proportional to the radius r of the rolled tape B. Thus, $$F = K_0 l = k_1 r \quad (3)$$

where $k_0$ and $k_2$ are constants.

Hence, the equation (2) can be rewritten as $$P = K \cdot k_1 \quad (4)$$

This means that the tension in the tape B is constant irrespective of changes in the radius r of the rolled tape B.

What is claimed is:

1. A machine for winding tape on a formed coil having spaced loop portions comprising:
   a bed;
   a tape winding unit provided on said bed and including a tape reel on which an electrically insulating tape is wound and a rotatable taping ring having a notch and carrying said tape reel; and
   a coil support unit provided on said bed and having a pair of support heads aligned with each other and means for adjusting the distance between support heads, and clamp means carried by each of said support heads for clamping the loop portions of a formed coil, means for mounting said clamp means for level adjustment and rotation about a horizontal axis,
   wherein said clamp means each includes a plate-like coil receiving element and a plate-like coil pressing member for clamping said loop portion of said formed coil and means for positioning said loop portion of said formed coil, wherein said positioning means is a pin projecting from said coil receiving element.

2. The machine according to claim 1, wherein said positioning means includes a hole formed in said coil pressing member for receiving said pin.

3. The machine according to claim 1, wherein said clamp means includes a toggle mechanism for opening and closing said coil pressing member with respect to said coil receiving element.

4. The machine according to one of claims 1 or 2 or 3, wherein said coil support unit includes guide rods provided in parallel to said base and said support heads each include a slider penetrated by, and slidable along said guide rods.

5. The machine according to claim 4, wherein said means for member supporting said clamping means each include a support supported for vertical movement with respect to said slider and a support shaft rotatably supported in said support member and having said clamp means secured thereto.

6. The machine according to claim 1, wherein said tape winding machine includes means for horizontally moving said tape winding unit.

7. The machine according to claim 6, wherein said horizontally movable means include a longitudinal feeder mounted for movement over said bed in first direction parallel to the direction in which said support heads are aligned to each other, and a transversal feeder mounted for movement over said longitudinal feeder in second directions perpendicular to said first directions.

8. The machine according to claim 7, wherein said horizontally movable means further includes a first feed screw extending over said bed and parallel to said first directions and meshing with said longitudinal feeder, a variable speed motor provided on said bed for rotating said first screw, a second feed screw extending over said bed and parallel to said second directions and meshing with said transversal feeder, and a variable speed motor provided on said transversal feeder for rotating said feed screw.

9. The machine according to claim 8, wherein said horizontally movable means includes a mechanism for turning said taping ring about a vertical axis.

10. The machine according to claim 9, wherein said mechanism is mounted on said transversal feeder.

11. The machine according to claim 5, wherein said taping ring has a spherical bearing fixed thereto and a tape guide roller having a retainer formed therein for holding said spherical bearing.

12. The machine according to claim 1, wherein said taping ring includes a tape tension control mechanism for applying a desired tension to said tape in cooperation with said tape reel.

13. The machine according to claim 12, wherein said tape tension control mechanism includes a brake drum rotatably supported by said taping ring and having said tape reel coaxially mounted thereon, and a brake shoe in frictional contact with said brake drum.

14. The machine according to claim 13, wherein said tape tension control mechanism further includes elastic biasing means for urging said brake shoe against said brake drum.

15. The machine according to claim 14, wherein said elastic biasing means is a compression coil spring.

16. The machine according to claim 15, wherein said tape tension control mechanism further includes a follower lever disposed diametrically opposed to said brake shoe with respect to said tape reel, said follower lever being pivotally coupled at one end to said taping ring and carrying at the other end a roller in contact with said tape wound on said tape reel, said brake shoe having a brake face complementary to said brake drum and two end portions on both sides of said brake face, one of said end portions being pivoted on said taping ring, said compression coil spring being connected at one end to the other end portion of said brake shoe and at the other end to an intermediate portion of said follower lever between the ends thereof.

* * * * *

UNITED STATES PATENT AND TRADEMARK OFFICE
CERTIFICATE OF CORRECTION

PATENT NO. : 4,488,685
DATED : December 18, 1984
INVENTOR(S) : TETUO IIDA

It is certified that error appears in the above-identified patent and that said Letters Patent is hereby corrected as shown below:

On the title page, Item [73] should read:

- -[73] Assignee: Tokyo Shibaura Denki Kabushiki Kaisha, Kawasaki, Japan - -

Signed and Sealed this

Thirtieth Day of April 1985

[SEAL]

Attest:

DONALD J. QUIGG

Attesting Officer    Acting Commissioner of Patents and Trademarks